US012680205B2

(12) United States Patent
Hernandez et al.

(10) Patent No.: US 12,680,205 B2
(45) Date of Patent: Jul. 14, 2026

(54) BINDER COMPOSITION FOR FIBERGLASS

(71) Applicant: AOC, LLC, Collierville, TN (US)

(72) Inventors: Edgardo M Hernandez, Collierville, TN (US); John McAlvin, Collierville, TN (US); Michael Beebe, Collierville, TN (US)

(73) Assignee: AOC, LLC, Collierville, TN (US)

( * ) Notice: Subject to any disclaimer, the term of this patent is extended or adjusted under 35 U.S.C. 154(b) by 735 days.

(21) Appl. No.: 17/421,955

(22) PCT Filed: Jan. 9, 2020

(86) PCT No.: PCT/US2020/012925
§ 371 (c)(1),
(2) Date: Jul. 9, 2021

(87) PCT Pub. No.: WO2020/146626
PCT Pub. Date: Jul. 16, 2020

(65) Prior Publication Data

US 2022/0112639 A1     Apr. 14, 2022

Related U.S. Application Data

(60) Provisional application No. 62/790,170, filed on Jan. 9, 2019.

(51) Int. Cl.
| | |
|---|---|
| *D04H 1/587* | (2012.01) |
| *C08L 33/04* | (2006.01) |
| *D04H 1/4218* | (2012.01) |
| *D04H 1/58* | (2012.01) |

(52) U.S. Cl.
CPC .............. *D04H 1/587* (2013.01); *C08L 33/04* (2013.01); *D04H 1/4218* (2013.01); *D04H 1/58* (2013.01); *D10B 2101/06* (2013.01)

(58) Field of Classification Search
CPC ........ D04H 1/587; D04H 1/4218; D04H 1/58; D10B 2101/06; C08L 33/04
See application file for complete search history.

(56) References Cited

U.S. PATENT DOCUMENTS

| | | | | |
|---|---|---|---|---|
| 3,657,379 A * | 4/1972 | Hilbelink et al. | ..... | C09J 167/06 528/109 |
| 3,911,049 A * | 10/1975 | Kracklauer | ....... | C08F 299/0442 525/27 |
| 4,207,282 A * | 6/1980 | Grisch | ................... | B29C 70/46 264/113 |
| 6,228,918 B1 * | 5/2001 | Hardebeck | ............... | C08K 5/13 524/359 |

\* cited by examiner

*Primary Examiner* — Patrick D Niland
(74) *Attorney, Agent, or Firm* — Baker Donelson

(57) ABSTRACT

A series of polyester and vinyl ester based insoluble binder compositions for use with fiberglass are provided. These compositions are comprised of cross-linkable unsaturated resins used in tandem with various azo initiators. The compositions are capable of thermally curing; creating a water and organic-insoluble binder exhibiting good adhesion to glass. These thermally cured binders are able to provide similar fiberglass tensile strength to the conventional dibenzoyl peroxide containing compositions, while exhibiting improved retention of whiteness over time.

20 Claims, No Drawings

BINDER COMPOSITION FOR FIBERGLASS

CROSS-REFERENCE TO RELATED APPLICATION

This application is a national stage entry of PCT/US20/12925, filed 9 Jan. 2020, which in turn derives priority from U.S. Provisional Patent Application No. 62/790,170, filed 9 Jan. 2019, the entirety of which are both incorporated herein by reference.

FIELD OF THE INVENTION

The present invention relates to fiberglass mat insoluble binder compositions. In particular, it relates to free radical initiated insoluble polyester and vinyl ester binder compositions for application on fiberglass mats.

BACKGROUND OF THE INVENTION

Most types of fiberglass mats produced require a binder in order to maintain the integrity of the final product. Continuous filament mat (CFM) is one such type of mat. This type of mat is produced by depositing molten glass strands directly onto a moving belt in a looping fashion. As the glass fibers cool down, a binder is applied to the mat while the CFM hardens in place. This type of mat is most commonly used in closed molding applications such as pultrusion, vacuum infusion processing, resin transfer molding, cold molding and others. In contrast, chopped strand mat (CSM) is produced by chopping continuous strand roving into short segments. These segments are then deposited on a moving belt and a binder applied to hold the fibers together.

In general terms, a binder provides a way for the fiberglass strands to bond to each other creating a more robust material, often with rigid structural integrity. As a general rule, the tensile strength of a fiberglass mat increases proportionally with the amount of binder added. The amount of binder placed on a fiberglass mat is proportionally controlled by the production line speed, which, on its part, is determined by measuring the limiting organic index (LOI).

In order to achieve binder cure on a desirable time-scale, the amount of thermal initiator is varied on the initial composition. The faster the production line, the more initiator is required to achieve the desirable degree of cure.

For example, current insoluble binder compositions used on continuous fiberglass mats are primarily made out of a polyester alkyd type resin intrinsically mixed with benzoyl peroxide. As the insoluble binder concentration is increased on a fiberglass mat, more yellowing is observed. The main cause behind this coloration of the mat are the decomposition products of benzoyl peroxide and their capacity to further oxidize the fiberglass mat and/or the materials on it. Thus, there remains a need for improved binder compositions offering greater performance characteristics and better aesthetic qualities.

SUMMARY OF THE INVENTION

The invention provides improved binder compositions useful in conjunction with CFM type fiberglass mats. The compositions comprise a curable unsaturated resin, one or more azo initiators, and a flow-enhancing additive. The ingredients are then generally combined and ground into a homogeneous powder having a particle size, of for example 25 to 1000, microns, with the particle size generally determined by the intended end-use. The homogeneous powder is then either applied directly by "dusting" the fiberglass mat as it is being formed, or is mixed with water into a slurry, which in turn is applied to the mat as it is being formed. The resulting fiberglass composite structures exhibit improved whiteness over time as compared to existing compositions utilizing peroxy-type initiator systems (e.g., benzoyl peroxide).

DETAILED DESCRIPTION OF THE INVENTION

The present invention provides binder compositions comprising (i) an unsaturated polyester or vinyl ester resin; (ii) an azo-type initiator and (iii) a flow-enhancing agent.

In certain embodiments, the unsaturated polyester or vinyl ester resin will be present in an amount of from about 80 to about 99.8 weight percent, about 90 to about 99.8 weight percent, or about 95 to about 99.8 weight percent.

In the compositions of the invention, in general, the term "unsaturated polyester" will be understood to mean a polyester made from maleic anhydride, maleic acid, fumaric acid, itaconic acid, itaconic anhydride and/or ester derivatives of these acids in combination with other carboxylic diacids and/or anhydrides, and glycols. The vinyl ester resins and unsaturated polyester resins used according to the present invention may be selected from the unsaturated polyester resins and vinyl ester resin as are known to a person skilled in the art of composites. The compositions may comprise one vinyl ester or unsaturated polyester or may utilize mixtures of vinyl esters and/or unsaturated polyesters. Malik et al., in J.M.S.-Rev. Macromol. Chem. Phys., C40(2&3), p. 139-165 (2000), describes examples of suitable unsaturated polyester or vinyl ester resins to be used as base resin systems in the resins of the present invention, which can be subdivided into the following categories. (1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, 1,4-butanediol, 1,6-hexanediol, 2-methyl-2,4-pentanediol, neopentyl glycol or hydrogenated bisphenol-A. (2) Iso-resins: these are prepared from isophthalic acid, maleic anhydride or fumaric acid, and glycols. (3) Terephthalic resins: these are prepared from terephthalic acid, maleic anhydride or fumaric acid, and glycols. This class of resins also includes resins in which poly(ethylene terephthalate) is used as a starting material and is converted to monomers through glycolysis in situ. (4) Bisphenol-A-fumarates: these are based on ethoxylated bisphenol-A and fumaric acid. (5) Vinyl ester resins: these are resins having unsaturated sites only in the terminal position. For example, such unsaturation may be introduced by reaction of epoxy resins (e.g., diglycidyl ether of bisphenol-A, epoxies of the phenol-novolac type, or epoxies based on tetrabromobisphenol-A) with (meth)acrylic acid. (6) Fumarate resins: these are resins derived from maleic acid, maleic anhydride, dimethyl maleate, fumaric acid, dimethyl fumarate, or diethyl fumarate, and glycols. (7) Maleate resins: these are resins derived from maleic acid, maleic anhydride, dimethyl maleate, or diethyl maleate, and glycols. (8) Itaconate resins: these are resins derived from itaconic acid, itaconic anhydride, dimethyl itaconate, or diethyl itaconate, and glycols.

The term "azo-type initiator" refers to a thermal free radical initiator having the general formula R—N═N—R', wherein R and R' are generally alkyl, or cycloalkyl groups, optionally possessing other functional groups. In certain embodiments, R and R' are selected from groups such as cyclohexyl; 1-cyclohexyl-1-cyano; and $C_3$-$C_9$ alkyl groups, optionally substituted by cyano, amido, or alkanoyl groups. Examples include products having the designations V-40, V-59, AIBN (azobisisobutyronitrile), V-65, V-70, V-601, and VAm-110, available from WAKO Chemicals USA, Inc., including such compounds as:

1,1'-azobis(cyclohexane-1-carbonitrile);
    2,2'-azobis(2-methoxybutyronitrile);
    2,2'-azobis(isobutyronitrile);
    2,2'-azobis(2,4-dimethylvaleronitrile);
    2,2'-azobis(4-methoxy-2,4-dimethylvaleronitrile);
    dimethyl 2,2'-azobis(2-methylpropionate); and
    2,2'-azobis(N-butyl-2-methylpropionamide).

Further examples include those available from Chemours under the VAZO® mark, including VAZO® 52, VAZO® 64, VAZO® 67, and VAZO® 88, which correspond to 2-2'-azobis(2,4-dimethylvaleronitrile); azobisisobutyronitrile; 2,2'-azobis(2-methylbutanenitrile); and 1,1'-azobis(cyclohexanecarbonitrile); respectively.

In certain embodiments, the azo-type initiators exhibit a self-accelerating decomposition temperature between about 40° to about 120° C.

In certain embodiments, azo-type initiator is present in an amount of about 0.25 to about 10.0 weight percent, about 0.25 to about 7.5 weight percent, or about 0.25 to about 5 weight percent.

The "flow-enhancing agent" in one embodiment is a long chain metal salt of a fatty acid. Examples include zinc, calcium, and magnesium salts of $C_7$-$C_{15}$ fatty acids such as zinc stearate, magnesium stearate, calcium stearate, aluminum stearate, and the like. Additionally, the flow-enhancing agent may be a fumed silica such as those sold under various product designations under the Aerosil® mark, marketed by Evonik. The flow-enhancing agent is generally blended with the resin component (1) and the azo-type initiator (2) and ground into a free flowing powder of varying particle size.

As used herein, the term "continuous filament mat" (CFM) will be understood to mean a fiberglass mat created by looping one or various continuous fiberglass strands to produce a random fiber orientation. (See, for example, U.S. Pat. No. 7,083,855, incorporated herein by reference.) The fiberglass may be of any known composition and category such as those known as "E-glass", "A-glass", "C-glass", "D-glass", "R-glass", "S-glass", and E-glass derivatives. In one embodiment, the CFM mat is comprised of E-glass.

We have discovered that the compositions of the invention are capable of binding the various fiberglass strands that make a continuous fiberglass mat, providing the necessary mechanical and aesthetic properties required in consumer applications. The compositions provided herein meet the criteria that fiberglass manufactures require to make appropriate fiberglass mats which exhibit improved whiteness retention over time as compared to existing peroxy-initiated composite structures.

The compositions of the invention are useful, for example, as a binder in a variety of applications such as in the manufacture of glass fiber composites including roofing shingles, insulation, and the manufacture of mats or blankets which can then be formed into a desired shape and cured to provide a rigid three-dimensional structure. See, for example, U.S. Pat. No. 5,393,849 and US 2004/0034154, incorporated herein by reference.

This invention can be further illustrated by the following examples of certain embodiments thereof, although it will be understood that these examples are included merely for purposes of illustration and are not intended to limit the scope of the invention.

4

Experimental Section

Example #1. An ethylene glycol fumarate was cooked until an acid value of 40 was achieved. 97.29 parts of this polyester alkyd were pulverized and mixed intrinsically with 2.46 parts of Azobisisobutyronitrile [VAZO® 64, AIBN] and 0.25 parts of Zinc stearate to produce Example #1.

Example #2. Following the procedure above, 96.87 parts of pulverized polyester alkyd, 2.88 parts of 2,2'-Azodi(2-methylbutyronitrile) [VAZO® 67, AMBN] and 0.25 parts of Zinc stearate were intrinsically mixed to produced Example #2.

Example #3. Following the procedure above, 96.08 parts of pulverized polyester alkyd, 3.67 parts of (1,1'-Azobis (cyanocyclohexane)) [VAZO® 88, ACHN] and 0.25 parts of Zinc stearate were intrinsically mixed to produced Example #3.

All the compositions above were mixed by placing the various materials in an epoxy lined container. This container was then placed on a rock tumbler for 1 hour. After, 2% water slurries were made out of each composition. Pieces of Uniconform mat (~1 ft²) were then soaked using the slurries. The soaked mats were allowed to air dry for 10 minutes and finally they were cured on a convection oven at 150° C. for a period of 10 minutes. The tensile strength of each cured mat was then determined.

TABLE 1

Tensile strengths provided to a Uniconform mat using the various compositions

| Test | ASTM | (Control) | Example1 | Example 2 | Example 3 |
|---|---|---|---|---|---|
| 4" Fabric Tensile Max Load | D4595 | 106.6 lbs | 57.4 lbs | 59.4 lbs | 83.0 lbs |
| Standard Deviation | D4595 | 7.6 lbs | 10.4 lbs | 12.7 lbs | 21.2 lbs |

The tensile strength results compiled from the Uniconform cured mats are summarized on Table #1 (vide supra). The Uniconform mats cured using examples 1 and 2 show about half the tensile strength compared to the E240-8T control. Example 3, which contains ACHN initiator, was capable of achieving close to 80% of the tensile strength shown by the control. These compositions show promise as a possible replacement to benzoyl peroxide compositions. The differences observed between examples 1-3 could be attributed to several factors: lower radical generating efficiency of azo initiators compared to dibenzoyl peroxide or benzoperoxide (BPO), higher water solubility of azo initiators compared to BPO and, the complexity of the method utilized to make cured mats with these compositions.

Statement of Industrial Applicability

Fiberglass composites are a common type of fiber-reinforced plastic with wide application in the water treatment, aircraft, boat, automobile, and many other industries. It's wide applicability results in part from the fact that it is non-magnetic, non-conductive, and moldable into complex shapes. The present invention provides improved binder compositions useful in conjunction with CFM type fiberglass mats. The disclosed fiberglass composite structures exhibit improved whiteness over time as compared to existing compositions utilizing peroxy-type initiator systems (e.g., benzoyl peroxide).

The invention claimed is:

1. A composition for binding fibers to form a continuous filament fiberglass mat, the composition comprising:
   (i) an unsaturated polyester or vinyl ester resin;
   (ii) an azo-type initiator; and
   (iii) a flow enhancing agent;
wherein the unsaturated polyester or vinyl ester resin is present in an amount of about 80 weight percent to about 99.8 weight percent, the total of (i), (ii) and (iii) being 100 weight percent of said composition.

2. The composition of claim 1, wherein the unsaturated polyester or vinyl ester resin is chosen from ortho-resins.

3. The composition of claim 1, wherein the unsaturated polyester or vinyl ester resin is chosen from iso-resins.

4. The composition of claim 1, wherein the unsaturated polyester or vinyl ester resin is chosen from terephthalic resins.

5. The composition of claim 1, wherein the unsaturated polyester or vinyl ester resin is chosen from Bisphenol-A-fumarates.

6. The composition of claim 1, wherein the unsaturated polyester or vinyl ester resin is chosen from vinyl ester resins.

7. The composition of claim 1, wherein the unsaturated polyester or vinyl ester resin is chosen from fumarate resins.

8. The composition of claim 1, wherein the unsaturated polyester or vinyl ester resin is chosen from maleate resins.

9. The composition of claim 1, wherein the unsaturated polyester or vinyl ester resin is chosen from itaconate resins.

10. The composition of claim 1, wherein the unsaturated polyester or vinyl ester resin is present in an amount of about 90 weight percent to about 99.8 weight percent, the total of (i), (ii), and (iii) being 100 weight percent.

11. The composition of claim 1, wherein the unsaturated polyester or vinyl ester resin is present in an amount of about 95 weight percent to about 99.8 weight percent, the total of (i), (ii), and (iii) being 100 weight percent.

12. The composition of claim 1, wherein the azo initiator has a decomposition temperature of between about 40° and 120° C.

13. The composition of claim 1 or 12, wherein the azo-type initiator is chosen from 1,1'-azobis(cyclohexane-1-carbonitrile); 2,2'-azobis(2-methoxybutyronitrile); 2,2'-azobis(isobutyronitrile); 2,2'-azobis(2,4-dimethylvaleronitrile); 2,2'-azobis(4-methoxy-2,4-dimethylvaleronitrile); dimethyl 2,2'-azobis(2-methylpropionate); 2,2'-azobis(N-butyl-2-methylpropionamide); and 2,2'-azobis(2-methylbutanenitrile).

14. The composition of claim 1, wherein the azo-type initiator is present in an amount of about 0.25 to about 10 weight percent, the total of (i), (ii), and (iii) being 100 weight percent.

15. The composition of claim 1, wherein the azo-type initiator is present in an amount of about 0.25 to about 7.5 weight percent, the total of (i), (ii), and (iii) being 100 weight percent.

16. The composition of claim 1, wherein the azo-type initiator is present in an amount of about 0.25 to about 5 weight percent, the total of (i), (ii), and (iii) being 100 weight percent.

17. The composition of claim 1, wherein the flow-enhancing agent is a metal salt of a C7-C15 fatty acid or a fumed silica.

18. The composition of claim 1 wherein the flow-enhancing agent is selected from zinc stearate, magnesium stearate, calcium stearate, aluminum stearate, and sodium stearate.

19. The composition of claim 1 or 17, wherein the flow-enhancing agent is fumed silica.

20. A continuous filament mat comprising fiberglass and the composition of claim 1.

* * * * *